United States Patent
Tucker et al.

[19]

[11] Patent Number: 6,151,639
[45] Date of Patent: Nov. 21, 2000

[54] SYSTEM AND METHOD FOR REMOTE OBJECT INVOCATION

[75] Inventors: Andrew G. Tucker, Los Altos; Madhusudhan Talluri, Fremont; Declan Murphy, San Francisco; Yousef A. Khalidi, Sunnyvale, all of Calif.

[73] Assignee: Sun Microsystems, Inc., Mountain View, Calif.

[21] Appl. No.: 08/879,150

[22] Filed: Jun. 19, 1997

[51] Int. Cl.[7] .................................................. G06F 13/00
[52] U.S. Cl. .......................................... 709/316; 709/203
[58] Field of Search ........................... 395/683; 709/303, 709/300, 203, 315, 316; 710/200

[56] References Cited

U.S. PATENT DOCUMENTS

| | | | |
|---|---|---|---|
| 5,187,790 | 2/1993 | East et al. | 709/316 |
| 5,261,098 | 11/1993 | Katin et al. | 707/1 |
| 5,475,819 | 12/1995 | Miller et al. | 709/203 |
| 5,483,652 | 1/1996 | Sudama et al. | 707/10 |
| 5,522,077 | 5/1996 | Cuthbert et al. | 707/103 |
| 5,577,251 | 11/1996 | Hamilton et al. | 395/671 |
| 5,581,461 | 12/1996 | Coll et al. | 705/5 |
| 5,724,803 | 3/1998 | Kleinman et al. | 709/318 |
| 5,808,911 | 9/1998 | Tucker et al. | 709/316 |
| 6,074,427 | 6/2000 | Fought et al. | 703/21 |

OTHER PUBLICATIONS

Linthicum, "Reevaluating Distributed Objects" (Tools & Strategies for IS Professionals (DBMS, Jan. 1997, vol. 10, No. 1, pp. 45–50).

"The Common Object Request Broker: Architecture and Specification" (Revision 2.0 Jul. 1995).

Microsoft "Microsoft Windows NT Server Cluster Strategy: High Availability and Scalability with Industry–Standard Hardware" (Microsoft, Business Systems Division White Paper).

*Primary Examiner*—Kenneth R. Coulter
*Attorney, Agent, or Firm*—Pennie & Edmonds LLP

[57] ABSTRACT

The present invention pertains to a system and method for performing remote object invocation. A object-oriented computing system includes a number of independent computing nodes that are interconnected via a communications link. The nodes represent client and/or server computers that do not share memory. Each node includes a number of domains having separate address spaces. Each domain includes one or more threads of execution that invoke one or more objects. The object's method can reside in the same domain as the requesting thread, in a different domain within the same node, or in a different domain in another node. A file descriptor is used to represent those objects whose methods reside in a different domain than the requesting thread. A file descriptor is a protected kernel entity that enables a thread to invoke an object. A thread can only access those objects for which it has received an associated file descriptor. An Object Request Broker (ORB) services the object invocation requests for those objects residing in different domains. The ORB provides a mechanism that translates the file descriptor used to reference an object in one domain into the file descriptor used to invoke the object in the domain having the object's method.

15 Claims, 13 Drawing Sheets

SYSTEM AND METHOD FOR REMOTE OBJECT INVOCATION

The present invention relates generally to distributed object operating systems and particularly for a transparent and secure mechanism for invoking objects residing in remote nodes.

BACKGROUND OF THE INVENTION

In a typical client/server computer network, the user of a client computer requests the execution of an object. In particular, the user requests the execution of a method associated with the object. Frequently, the object is not stored locally on the client computer. Thus, a remote procedure call (RPC) must be made to a server computer on which the object resides. The RPC specifies the object and its associated method. The server computer identifies the method to be executed, executes that method, and passes the results and/or exceptions generated back to the client computer. A standard distributed mechanism for handling remote procedure calls is often referred to as an Object Request Broker (ORB). The mechanism is distributed in the sense that the software associated with an ORB is on both the client computer and the server computer.

For the purpose of this document, the term "invoke an object" is defined to mean invoking a method associated with the object.

The ORB enables a user to access objects residing in different address spaces. When a user is permitted access to the ORB, it can invoke any object residing within the distributed system. A user denied access to the ORB is restricted from accessing any object outside the user's address space. Thus, in order to permit remote object invocations, a user is given unrestricted access to all remote objects. Currently, there is no effective mechanism to restrict a user's access via the ORB to select objects residing outside the user's address space. Such unrestricted access can have potentially disastrous ramifications.

SUMMARY OF THE INVENTION

In summary, an embodiment of the present invention is a distributed object-oriented computer system having a secure mechanism to control access to objects. The mechanism is secure since it utilizes a kernel-protected file descriptor as the handle for the object's invocation. An application can only access those objects for which it has acquired a corresponding file descriptor.

The distributed system includes independent computing nodes that are interconnected via a communications link. The nodes represent client and/or server computers that do not share memory. Each server node is associated with a number of objects whose methods are resident in the node. A file descriptor is used to invoke an object. It is a protected kernel state that cannot be forged by a user application.

A server node controls access to its objects. A server node enables a client node access to one of its objects by exporting to the client node a reference to the object. The exported object reference enables a client node to invoke the object. The client node creates its own file descriptor to reference the exported object. The server node invokes the object using its own file descriptor which differs from the client node's file descriptor for the object.

The object reference is a mechanism that establishes the ORB infrastructure needed to support a subsequent object invocation. This ORB infrastructure includes an xdoor and a gateway handler. The xdoor is a protected kernel state that has a global identifier that uniquely identifies the object within the distributed system. The gateway handler is responsible for mapping the global identifier associated with an object into a respective file descriptor.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Overview

Figure 1:
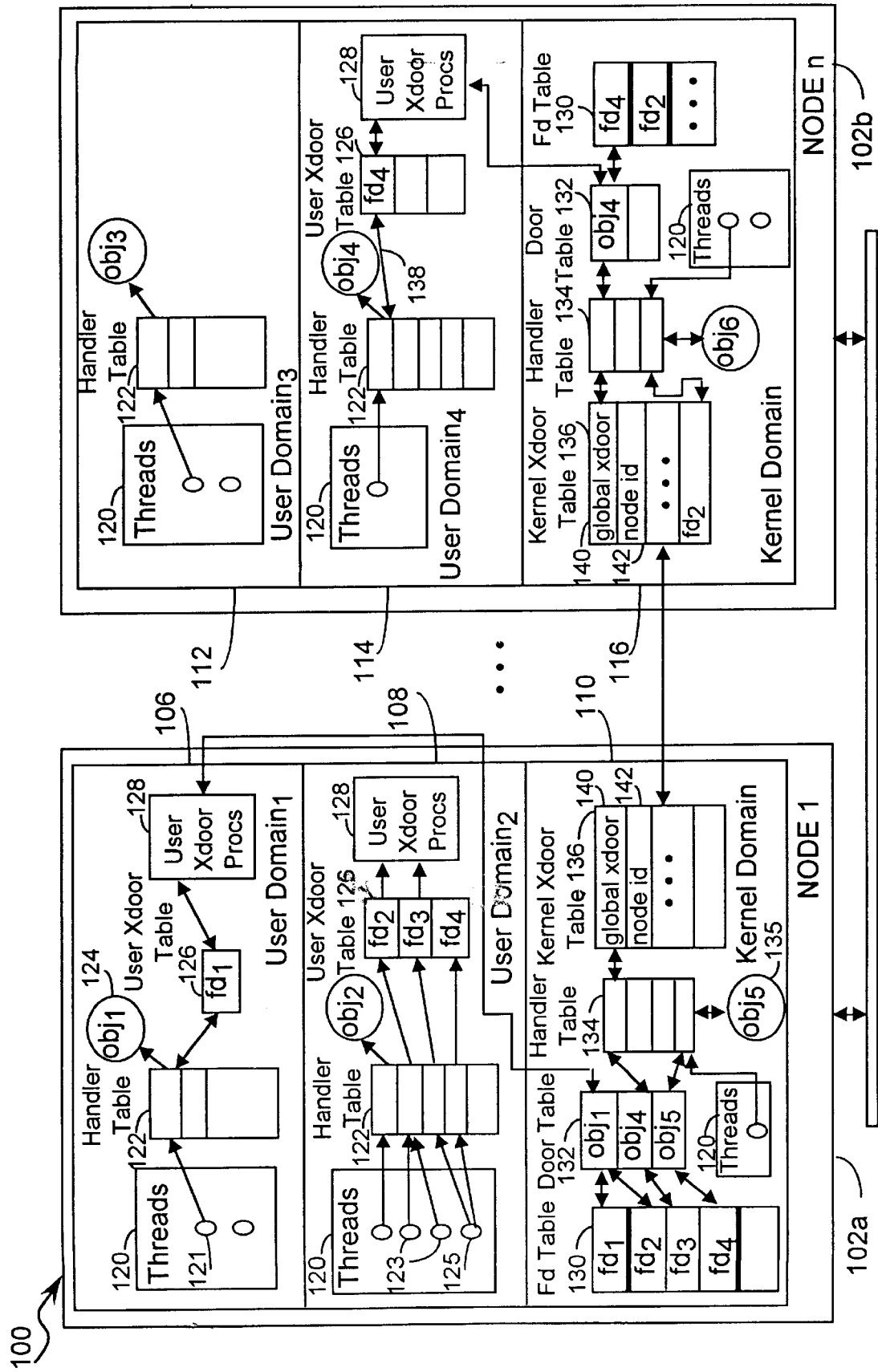
FIG. 1 is a block diagram of a computer system incorporating an embodiment of the present invention.

Referring to FIG. 1, there is shown a distributed computer system 100 including a plurality of computing nodes 102. Each computing node 102 represents an independent client/server computer that is interconnected via a communications link 104. Each node can be considered a client and/or a server computer. A client computer is associated with a node that invokes an object. A server computer is associated with a node that stores the object's methods. In certain cases, as will be shown below, the client and server computer will be the same node. In other cases, the client and server computers are distinct nodes.

The communications link 104 generically refers to any type of wire or wireless link between computers, such as but not limited to a local area network, a wide area network, or a combination of networks. The client/server computers use the communications link 104 to communicate with each other.

Each node 102 has one or more domains 106, 108, 110, 112, 114, 116. A domain is defined to be a process with its own address space. A domain can have multiple threads 120 of execution (usually called threads) that can execute user or kernel application procedures. A kernel domain 110, 116 refers to the operating system and a user domain 106, 108, 112, 114 refers to a process other than the operating system. The user domains 106, 108, 112, 114 typically execute one or more user application procedures. Each domain 106, 108, 110, 112, 114, 116 has one or more objects associated with it.

In a preferred embodiment, the operating system or kernel is the Solaris MC operating system, which is a product of Sun Microsystems, Inc. Background information on the Solaris MC operating system can be found in "Solaris MC: A Multi-Computer OS," Technical Report SMLI TR-95-48, November 1995, Sun Microsystems, which is hereby incorporated by reference.

The Solaris MC operating system is a UNIX based operating system. As such, in describing the present technology, UNIX terminology and concepts are frequently used. However, this is for illustration purposes and is not to be construed as limiting the invention to this particular operating system design.

Each thread can request the execution of an object (i.e., object's method). The location of the object is transparent to the thread. The object can reside in one of several locations. It can reside within the same domain as the requesting thread, in a different domain as the requesting thread but within the same node as the requesting thread, or in the domain of a remote node. For example, user domain 106 depicts a thread 121 with access to object 124 that resides within its domain. User domain 108 shows two threads 123 that reference object 124. Threads 123 reside in a different domain 106 from object 124 but are located in the same node 102*a*. Threads 123 reference object 124 through file descriptor $fd_2$ which is mapped into file descriptor $fd_1$ associated with the object in domain 106.

In addition, thread 125 references an object 138 that resides in a domain 114 in remote node 102*b*. Object 138 is represented in the referencing domain 108 as file descriptor $fd_3$ which is mapped into a system-wide identifier consisting of a global xdoor identifier 140 and node identifier 142. The system-wide identifier is transmitted in a remote object invocation request to the appropriate remote node 102*b*. The remote node 102*b* translates the system-wide object identifier to the appropriate local identifier and executes the method associated with the requested object 138.

Furthermore, thread 125 can reference an object 135 within the kernel domain 110. Object 135 is represented in referencing domain 110 as file descriptor $fd_4$ which is then mapped into the appropriate handler procedure 134 that is used to invoke the object 135.

A kernel domain 110, 116 has multiple threads 120 that can execute kernel applications. Each kernel domain 110, 116 can have one or more kernel objects associated with it. A kernel object can be invoked by a thread within its domain or by a thread in a domain in another node.

The execution of an object method for an object that is within the domain of the requesting application is treated as a local procedure call. The local procedure call is typically a function or subroutine call that transfers control from the application to the object's method with a return of control to the application. The arguments associated with the object are passed along in the local procedure call.

The execution of an object method for an object that resides in a remote domain is treated as a remote procedure call. The remote procedure call is handled by the ORB. Thus, the ORB is used to invoke the methods of objects residing in different domains as the requesting application. The remote objects can be situated in the same node or in a different node as the requesting application.

A door is a kernel state entity that describes an object's method and data. It exists only for intra-node remote user objects (i.e., an intra-node remote user object is an used object that resides in a different domain within the same node as the requesting domain). A door is represented by a file descriptor (fd). Each user domain 106, 108, 112, 114 has a user xdoor table 126 that stores the file descriptors of those objects accessible by threads associated with the domain. A user domain references a remote object through a file descriptor, located in the domain's user xdoor table 126, which is mapped into the actual door. The doors do not reside in the address space of the user accessible domains, rather in the kernel domain.

The use of a file descriptor 154 to represent a door provides a secure mechanism to control the objects that a user can invoke. A file descriptor 154 is a protected kernel state and as such cannot be forged by a user. The possession of a file descriptor 154 indicates that an application has permissible access to an object. The domain that generates the object becomes a server for the object and its door. The server exports object references to those applications that it wishes to have access to the object. In this manner, there is a secure mechanism to selectively control the applications that can access the objects within the distributed system 100.

An object can have a number of file descriptors 154 associated with it. These file descriptors 154 can reside in the same domain as the object or in different domains having permitted access to the object. Each client domain that references a remote object has one or more file descriptors representing the object. For example, object 124 is referenced by file descriptor $fd_1$ in domain 106, and by file descriptor $fd_2$ in domain 108. Object 138 is associated with file descriptor $fd_4$ in user domain 114 in node 102*b* and is associated with file descriptor $fd_3$ in user domain 108 in node 102*a*. In essence, the file descriptor is a local identifier for the object within a particular domain.

Objects that are accessible by remote nodes have an xdoor 170 (see FIG. 2) identified by a global xdoor identifier 140 that is used to uniquely identify the object within a particular node. In addition, each node is uniquely represented by a node identifier 142 that uniquely identifies the node within the distributed system 100. The global xdoor identifier 140 is coupled with the node identifier 142 to produce an identifier that uniquely identifies the object within the distributed system 100.

An application refers to an object utilizing a local xdoor identifier or file descriptor. In order to execute a remote object invocation, the ORB needs to reference the object using the server's file descriptor for that object. Thus, the ORB maps the client's object reference (i.e., local xdoor identifier) into the server's local xdoor identifier. This mapping is performed utilizing a number of procedures and data structures that reside in both the user and kernel domains.

The ORB utilizes several mechanisms to perform this mapping. The ORB includes the following procedures: handler procedures, xdoor procedures, and gateway handler procedures. The xdoor procedures reside in both the user and kernel domains. A brief description of these mechanisms is provided below with reference to FIG. 2. A more detailed explanation is provided below with reference to FIGS. 3–6.

An object is referenced by a handler procedure 122. The handler procedure 122 controls the basic mechanism of object invocation and argument passing. The handler 122 controls how an object invocation is implemented, how object references are transmitted between address spaces, how object references are released, and similar object runtime operations. For local object invocations, the handler procedure 122 executes a local procedure call to the object's method 150.

For remote user object invocations, an object is represented in its domain by a user-level xdoor 152. A user-level xdoor 152 consists of a local xdoor identifier 153, a pointer to an appropriate handler 156, a door identifier 158, and other information. In an embodiment of the present invention, the local xdoor identifier 156 is a file descriptor. The door identifier 158 corresponds to a door representing the object and it is stored in the kernel-level door table 132.

A kernel-level xdoor 170 is a kernel state entity that is used to represent an object throughout the distributed system. The kernel-level xdoor 170 includes a global xdoor identifier 140, a node identifier 142, handler pointers 144 including a server handler pointer 141 and a client handler pointer 143, a door identifier 146, and a local xdoor identifier 147. The global xdoor identifier 140 is used to uniquely identify the object within the node and the combination of the global xdoor identifier 140 and the node identifier 142 is used to uniquely identify an object within the distributed system 100. The door identifier 146 is used to identify the corresponding door 162.

A kernel object is represented in the kernel domain by a kernel-level xdoor 170. A kernel object's xdoor 170 contains an additional field that includes a local xdoor identifier 147 representing the kernel object in the kernel domain. Typically, the local xdoor identifier 147 is a file descriptor 154.

A kernel-level file descriptor table 130 is used to store each file descriptor 154 existing within a node 102. The file descriptor table 130 is partitioned into segments 155. Each segment represents the file descriptors 154 associated with a particular domain. Each file descriptor entry 154 references a door stored in a kernel-level door table 132. A door 162 includes a door identifier 164, a process location pointer 166, and other information. The process location pointer 166 reflects an entry point to a procedure in the server's address space that is used to perform the invocation. In the case of an intra-node remote user object invocation, the process location pointer 166 is used to access the server's xdoor procedures 128. For the case of an inter-node remote object invocation or a remote kernel object invocation, the process location pointer 166 is used to access a gateway handler 168 associated with the object. The gateway handler 168 is used to facilitate the transport of the remote object invocation request to the corresponding node. The gateway handler 168 translates object invocations utilizing file descriptors 154 to a respective system-wide identifier.

The foregoing overview has described the computing environment and infrastructure that is used to support a remote object invocation. Attention now turns to a more detailed description of the steps used by a user application and a kernel application in invoking an object.

User-Level Remote Object Invocation

Figure 2:
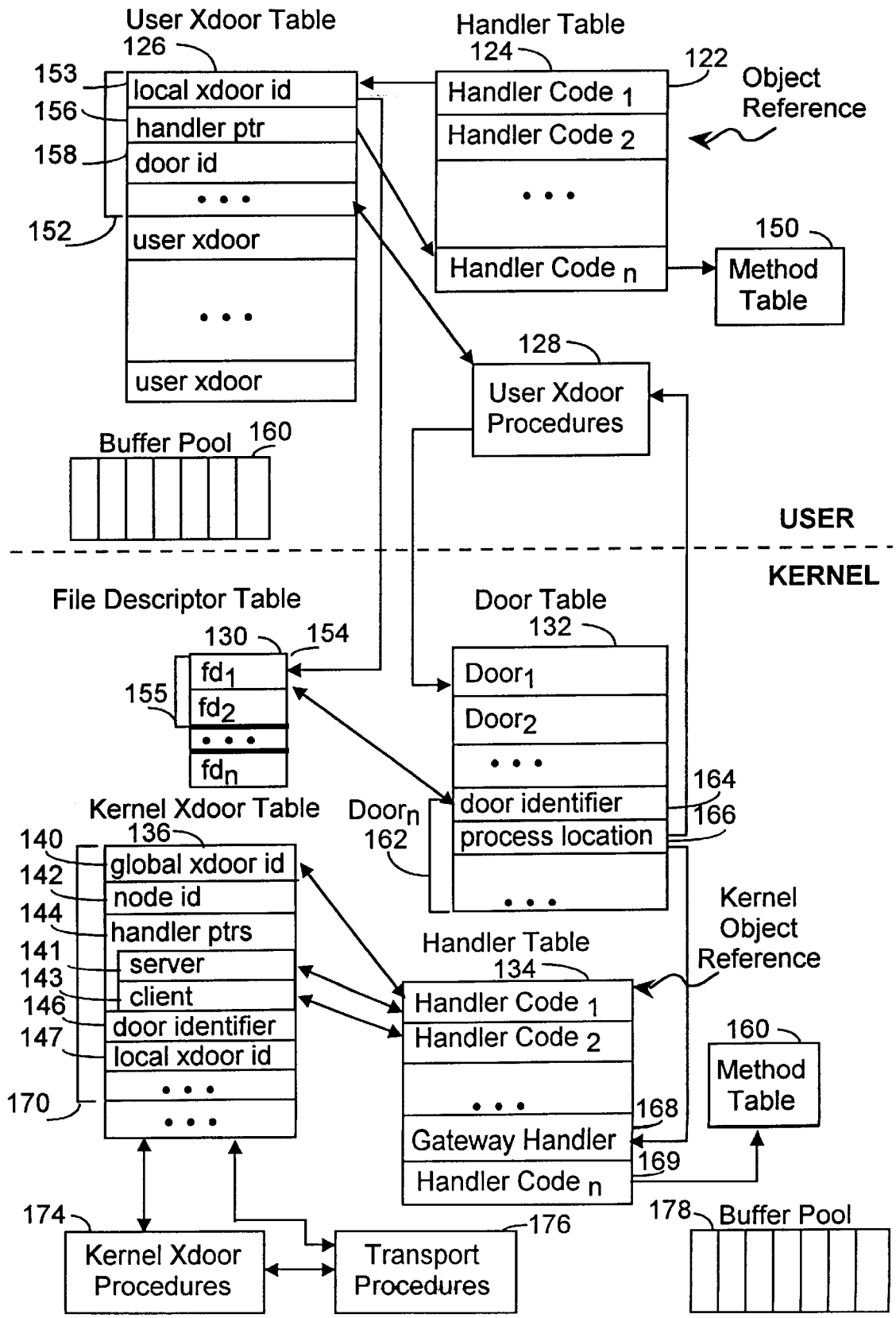
FIG. 2 is a schematic representation of the procedures and data structures used to implement a remote object invocation.

The operations of the apparatus of FIGS. 1 and 2 are more fully appreciated with reference to FIGS. 2–4. In an embodiment of the present invention, client/user and kernel application procedures can utilize the ORB to request remote object invocations. The steps used by the user and kernel application procedures to perform a remote object invocation differ slightly and as such will be discussed separately. The discussion will first describe the steps used by the user application procedures followed by the steps used by the kernel application procedures.

The ORB of the present invention is based on a call/return model. In such a model, a remote object invocation request is generated to execute or call a specified object's method and to return the results and/or exceptions to the invoking thread.

A client user application 200 references an object by generating a procedure call requesting the execution of a specified method of the object (step 400). The procedure call is typically accompanied by a number of arguments that can include, but are not limited to, data, procedures, or other object references. A client stub procedure 202 receives the procedure call by the client user application 200. The client stub procedure 202 appears to the user as the actual method that it intends to invoke. The client stub procedure 202 formats the object's arguments into a predefined format (step 402). For example, the format can consist of one data structure that describes the type of each argument and another data structure that contains the arguments. The client stub procedure 202 then transfers the object reference and its formatted arguments to a client handler procedure 122 (step 402).

A client handler procedure 122 is associated with an object and used to marshal the object's arguments into one or more buffers 160 (step 404). The client handler procedure 122 also transfers control to a client user xdoor procedure 128 passing to it the local xdoor identifier 153 associated with the object and the location of the buffer in the buffer pool containing the object's arguments (step 404). The local xdoor identifier 153 is stored in a user xdoor table 126 located in the application's address space. In an embodiment of the present invention, the local xdoor identifier 153 is a file descriptor.

The client user xdoor procedure 128 maps the local xdoor identifier 153 associated with the object reference and associated with the object's arguments into their respective file descriptors (step 406). The client user xdoor procedure 128 then suspends execution of the thread and calls a procedure that will invoke the object (step 406).

The client user xdoor procedure 128 utilizes the door associated with the invoked object to determine the appropriate procedure that will invoke the object. The door associated with each object is stored in kernel-level door table 132 (sometimes referred to in Unix nomenclature as a "vnode table"). Each door 162 stored in the door table 132 contains an associated door identifier 164 that uniquely identifies the door 162, a process location 166, and additional information. The process location 166 represents an entry point into the server domain procedure that is responsible for invoking the object. Typically, the process location 166 is the location of either a server user xdoor procedure 128 residing in a server domain or a kernel-level gateway handler 168. The process location 166 represents the server user xdoor procedure 128 for intra-node remote object invocations. The process location 166 represents the kernel-level gateway handler 168 for inter-node remote object invocations.

For the situation where the object resides in a different user domain within the same node (local user domain), the client user xdoor procedure 128 calls a specified kernel-level procedure (i.e., door_call) that sends an invocation message to a server xdoor procedure 128 specified by the process location 166 indicated by the object's door 162. The invocation message includes the door identifier 164 of the requested object, the argument buffer, as well as other information. The server xdoor procedure 128 utilizes the door identifier 164 to locate within the server user xdoor table 126, the server's file descriptor, or local xdoor identifier, of the requested object (step 408). The server xdoor procedure 128 then proceeds to invoke the object as will be described in more detail below.

To invoke a kernel object in the same node or an object in a remote node (remote node or local kernel domain), the client user xdoor procedure 128 calls a specified kernel-level procedure (i.e., door_call) that transfers control to a gateway handler 168 specified by the process location 166.

The gateway handler 168 associated with the object translates all file descriptors to their respective global xdoor identifiers 140. In addition, the global xdoor identifiers 140 are mapped into system-wide identifiers by coupling to the global xdoor identifier 140 its respective node identifier 142. The format of the data in the buffers is translated into a format suitable for the kernel-level xdoor procedure 174. The gateway handler 168 then calls the client kernel xdoor procedure 174 with the object's arguments (step 409). The client kernel xdoor procedure 174 then transfers control to the appropriate kernel server handler 169 (step 410).

For a remote node object invocation, the client kernel xdoor procedure 174 allocates a reply buffer, converts the arguments into a logical message representing a remote object invocation request, assigns a remote procedure identifier representing the logical message, and transfers the message to the transport procedure 176 (step 412).

The transport procedure 176 sends the message to the appropriate server node (step 414). The transport procedure 176 can utilize any of the well-known "transport layer" communication protocols such as but not limited to, transmission control protocol (TCP), user datagram protocol (UPD), or the like.

When the remote object invocation request arrives at the destination node, the transport procedure 176 at the destination node receives the message and extracts the system-wide identifier. It determines whether or not the xdoor 170 corresponding to the system-wide identifier exists in the node by searching the kernel-level xdoor table 136 for a corresponding entry. If such an entry exists, the transport procedure 176 transfers the message to the server kernel-level user xdoor procedure 174 (step 416). If such an entry does not exist, the server kernel-level user xdoor procedure 147 generates an xdoor which will be described below.

The server kernel-level user xdoor procedure 174 decodes the message, transforms its data into an appropriate format, and determines the server handler associated with the enclosed xdoor 170. The global xdoor identifier 140 transmitted in the message is mapped via the kernel xdoor table 136 to the appropriate server handler which continues the invocation (step 418).

A kernel object 206 will have a server handler pointer 141 that indicates an associated kernel server handler 169. A user object will have a server handler pointer 141 that indicates an associated gateway handler 168.

The server gateway handler 168 maps the global xdoor identifiers associated with all object references in the message into the corresponding server file descriptors and performs a kernel-level procedure (i.e., door_upcall) that transfers control to the server user xdoor procedure 128 (step 420).

The gateway handler 168 maps a global xdoor identifier 140 into a corresponding server-side file descriptor 154 by utilizing the appropriate door identifier 146 located in the xdoor 170. The door identifier 146 is mapped via the appropriate door 162 stored in the door table 132 into the corresponding file descriptor via the file descriptor table 130. The process location 166 of the associated door 162 contains the location of the server user xdoor procedure 128 (step 420). The server user xdoor procedure 128 utilizes the file descriptor 154 as the local xdoor identifier to determine and call the appropriate server handler procedure 122 (step 421).

The server handler procedure 122 unmarshals the object's arguments into a generic format and calls the server skeleton procedures 212 (step 422). The server skeleton 212 converts the arguments from the generic format into a format suitable for the object and invokes the object's method (step 424).

Once the object's method is executed, the return parameters are marshaled if no exception was produced. Otherwise, the exception itself is marshaled. At this point, the marshaled reply is ready (step 426). The server skeleton 212 converts the reply into a generic format and calls the associated server handler procedure 122 (step 428). The server handler 122 marshals the reply data into buffers 160 and calls the appropriate server xdoor procedure passing the local xdoor identifier 153 (step 430). For kernel objects, the server kernel xdoor procedure 174 is called. For user objects, the server user xdoor procedure 128 is called.

The server user xdoor procedure 128 maps the local xdoor identifier 153 into a corresponding file descriptor and makes the appropriate remote procedure call (step 432).

For the situation where the requested object resides in the same node but in a different user domain (local user domain), the server user xdoor procedure 128 maps the local xdoor identifiers into their respective file descriptors and calls a specified kernel-level procedure (i.e., door_call) that sends a reply message to the client user xdoor procedure 128 (step 432). The client user xdoor procedure 128 maps the file descriptors in the reply message to the client-side file descriptors and transfers control to the appropriate client handler (step 434). The client handler proceeds to process the reply message as will be described in more detail below.

For a remote node object invocation, the server user xdoor procedure 128 maps the local xdoor identifiers 153 into their respective file descriptors 154 and calls the associated gateway handler 168 (step 432). The gateway handler 168 translates all file descriptors in the reply message to their respective global xdoor identifiers and manipulates the reply data into a form recognizable by the server kernel xdoor procedure 174 (step 436). The gateway handler 168 transfers control to the server kernel xdoor procedure 174 (step 436).

The server kernel xdoor procedure 174 stores the reply data in a reply buffer 178, formats a logical message with the reply data and assigns it a RPC identifier, and transfers the message to the transport procedure 176 (step 438).

The server transport procedure 176 transmits the message to the client transport procedure 176 of the appropriate node (step 440). The client transport procedure 176 receives the message and after determining that it was delivered to the correct node, calls the client kernel xdoor procedure 174 (step 442). The client kernel xdoor procedure 174 then passes the reply message to the appropriate handler (step 444). The appropriate handler is determined by utilizing the global xdoor identifier in the message to find the associated xdoor 170. The xdoor's client handler pointer 143 indicates the appropriate handler. In this instance, it is a client gateway handler 168.

The client gateway handler 168 converts the global xdoor identifier to its respective file descriptor 154 and calls the associated client user xdoor procedure 128 (step 446). The client user xdoor 128 maps the file descriptors into their respective client local xdoor identifiers and calls the associated client handler 122 (step 448). The client handler 122 unmarshals the arguments in the reply message into a generic format and calls the client stub procedure 202 (step 450). The client stub procedure 202 formats the arguments into a suitable format for the client application (step 452) and the client application resumes (step 454).

Kernal-Level Remote Object Invocation

A kernel application can access a kernel object whose methods are in the same kernel domain or in a different kernel domain in a remote node. In addition, a kernel application can access a user object whose methods are in a different domain within the same node or in a different node. The remote object invocation initiated from a kernel application encompasses some of the same steps that were used by a user-initiated remote object invocation.

Figure 3A:
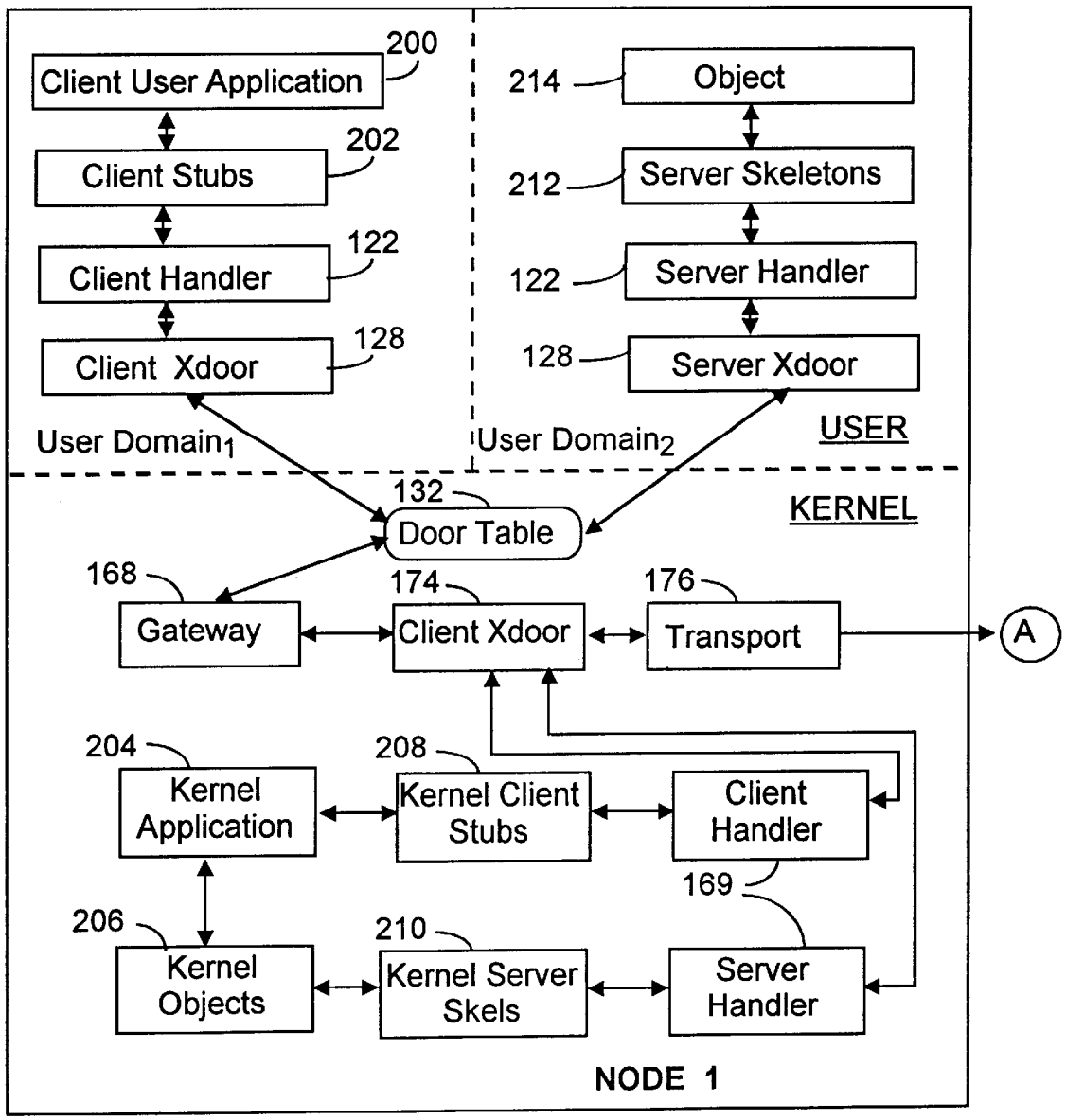
FIGS. 3A–3B are schematic representations of the procedural flow used to implement a remote object invocation.
Figure 3B:
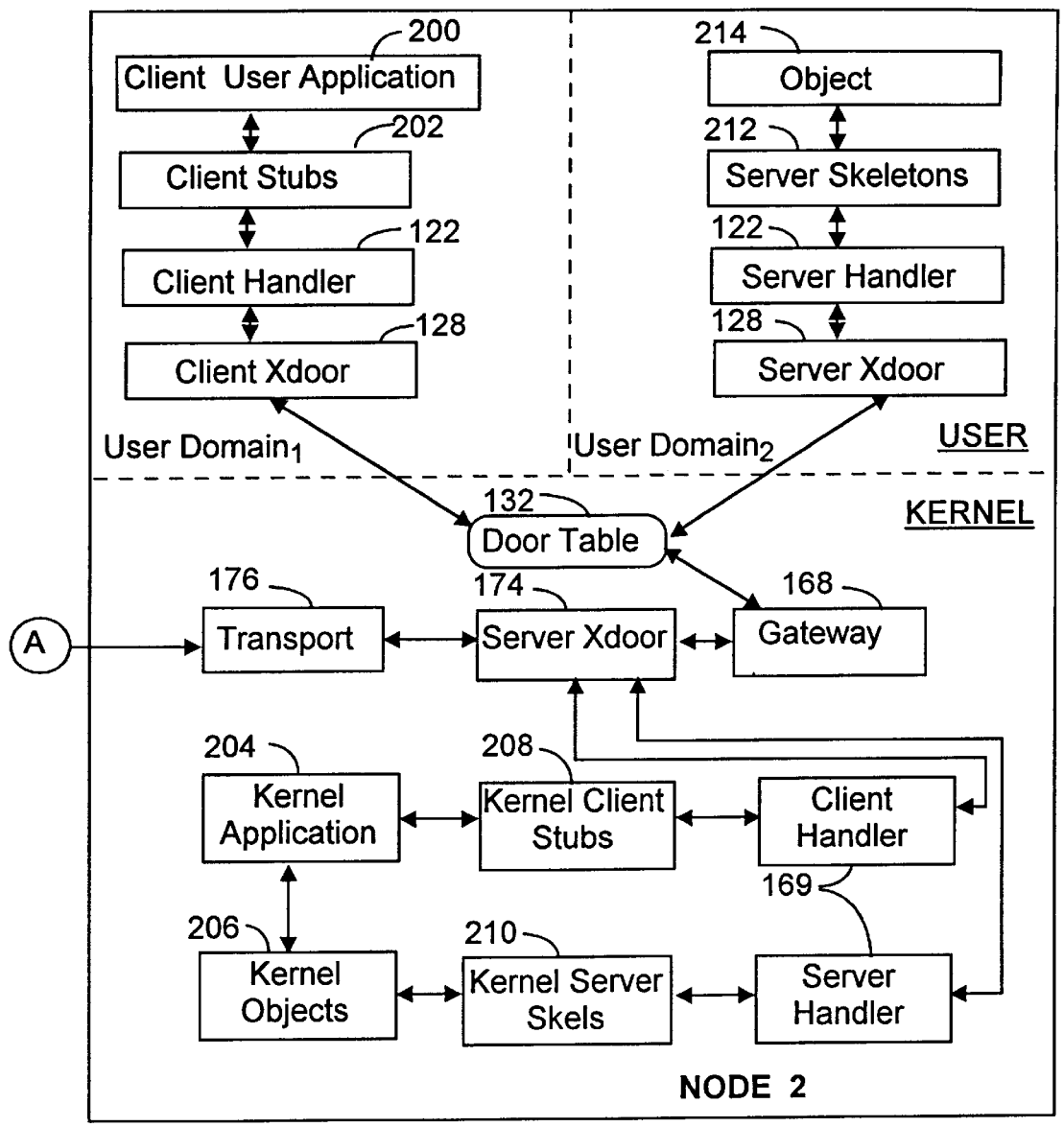
Figure 4A:
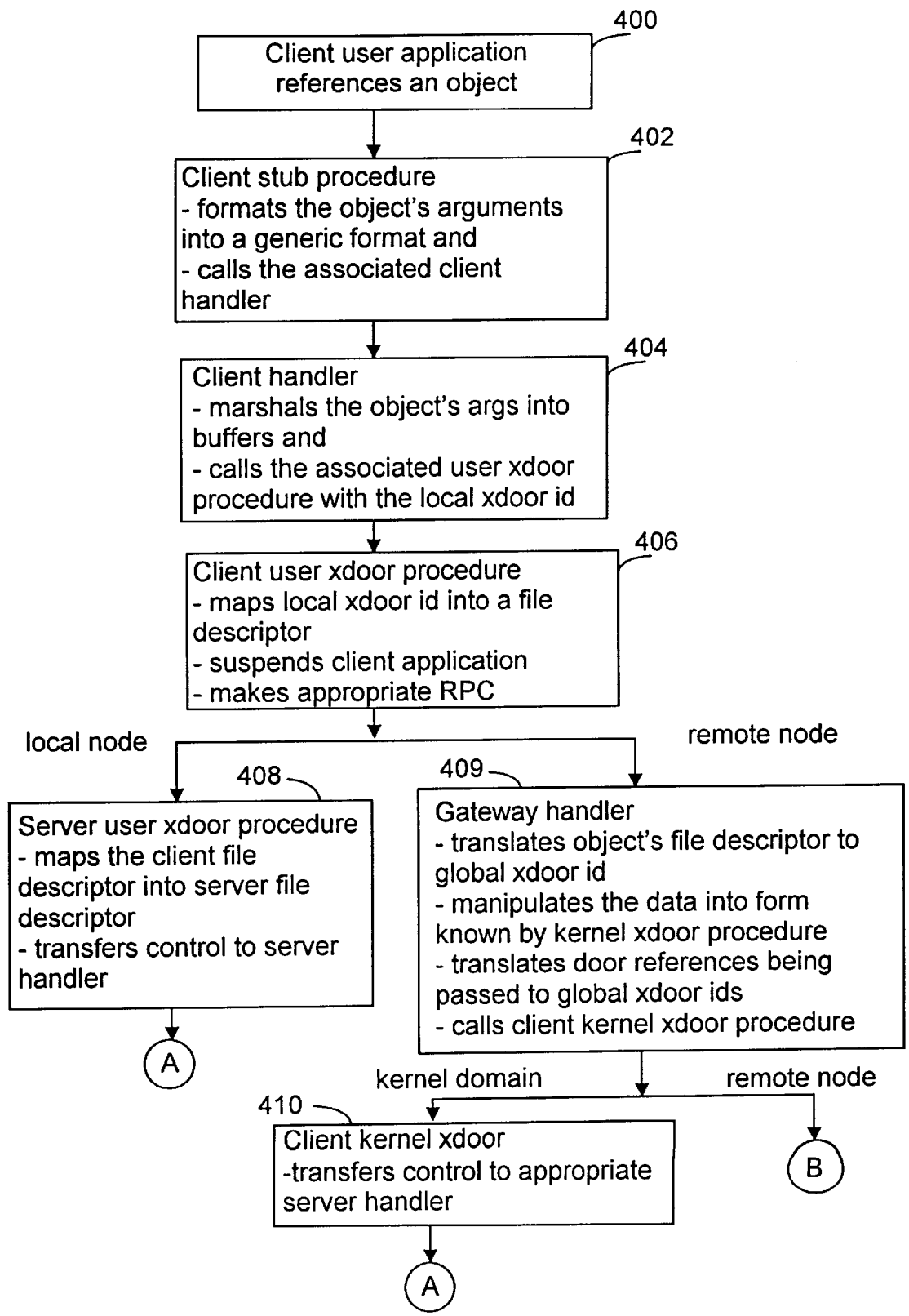
FIGS. 4A–4E are flow charts illustrating the steps used to implement a user-level remote object invocation.
Figure 4B:
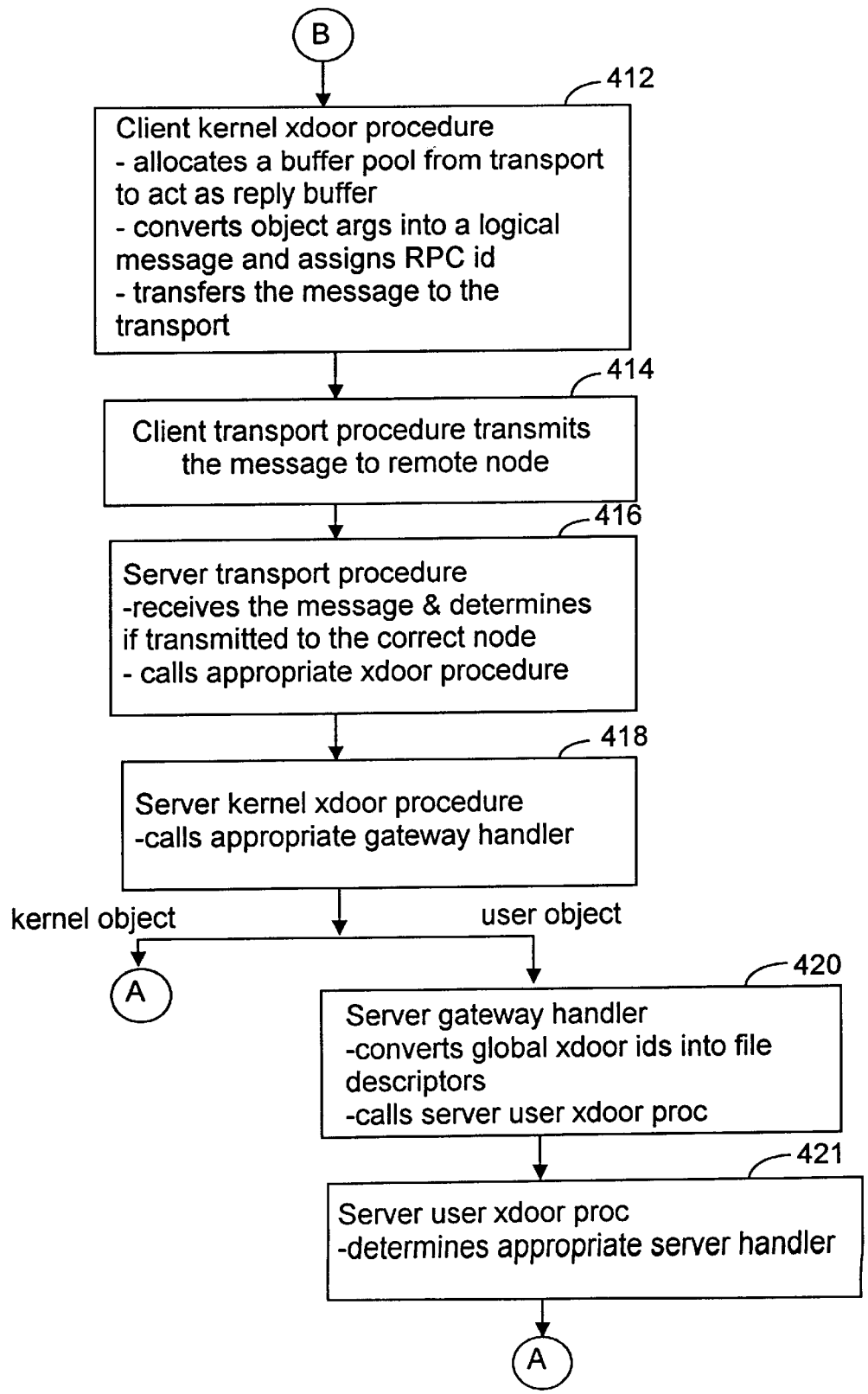
Figure 4C:
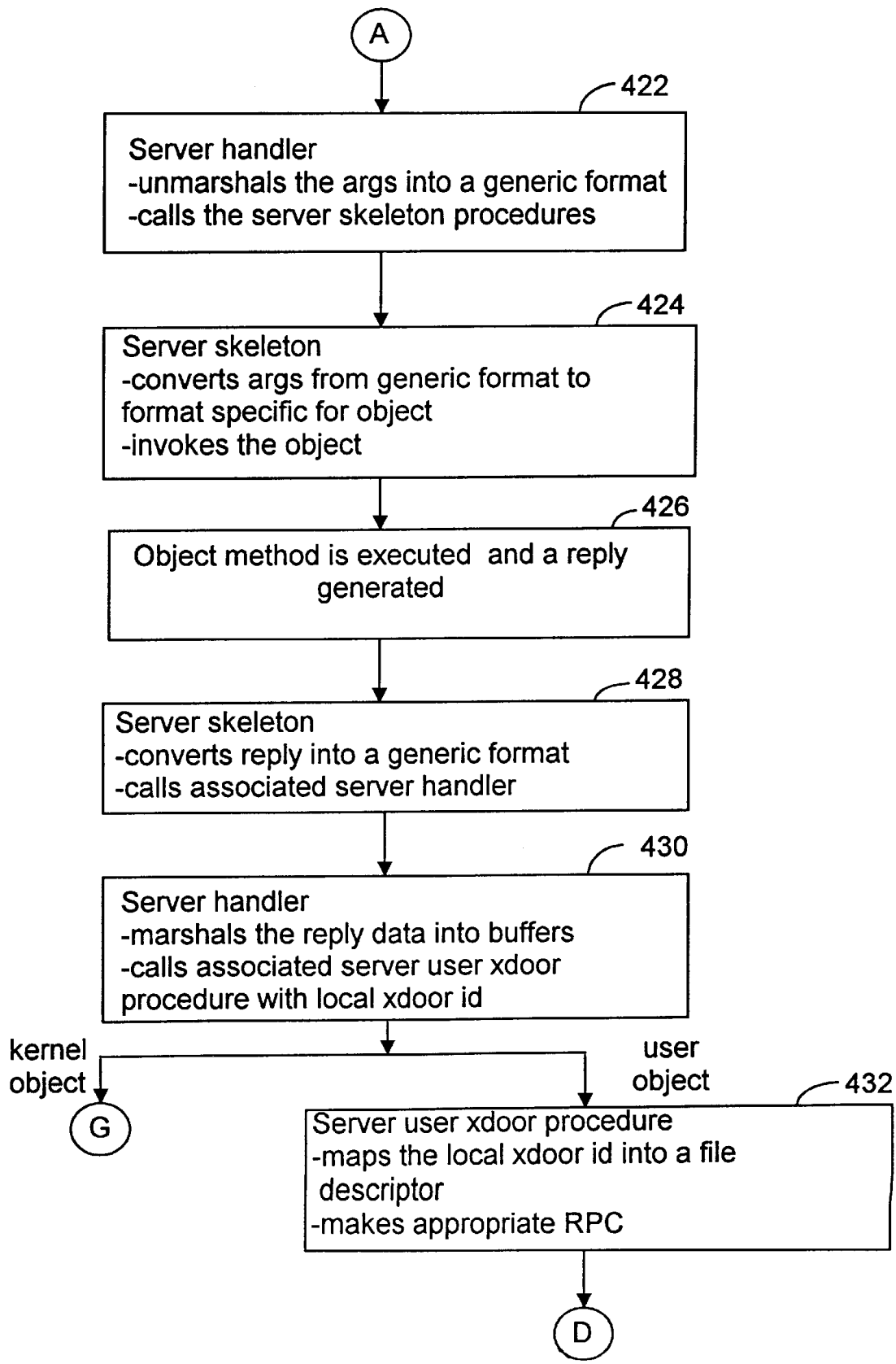
Figure 4D:
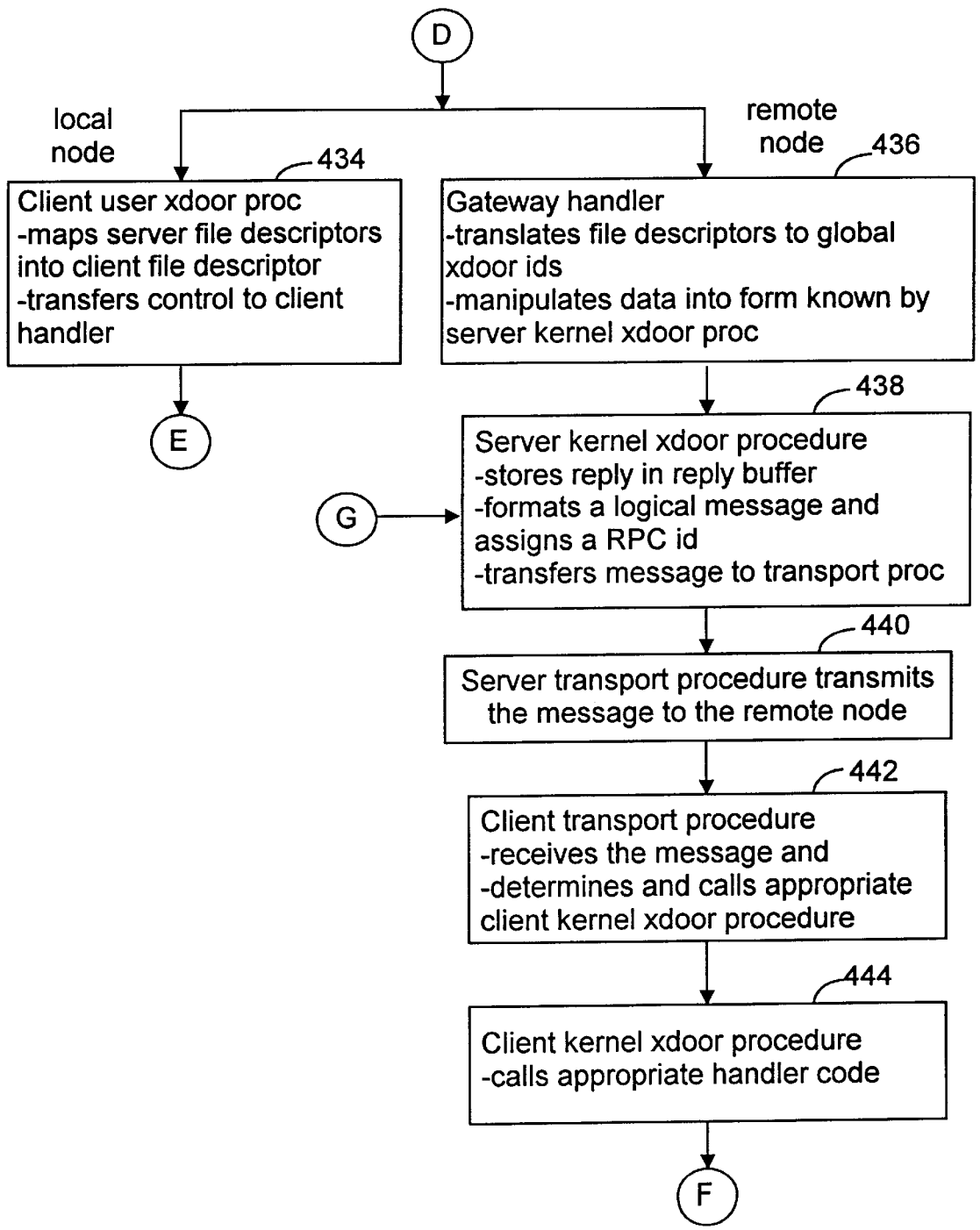
Figure 4E:
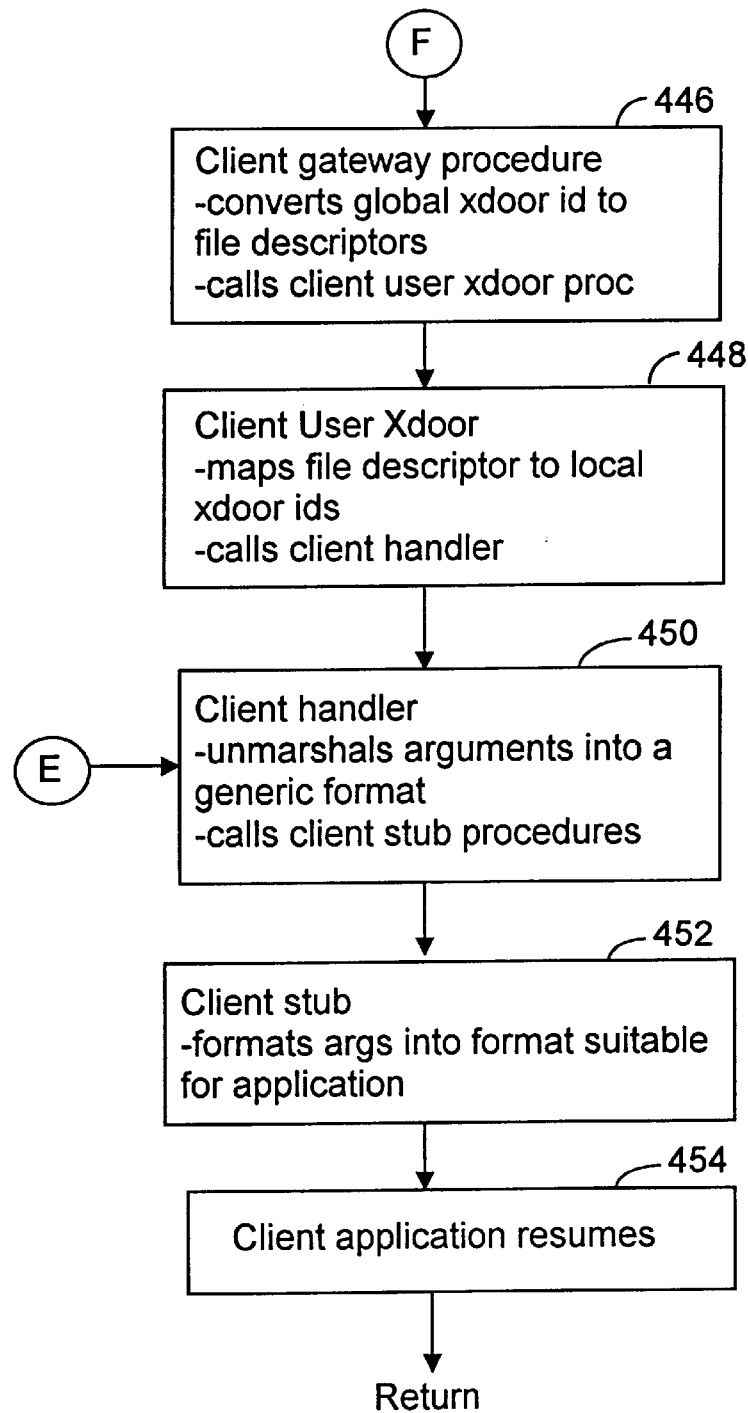
Figure 5A:
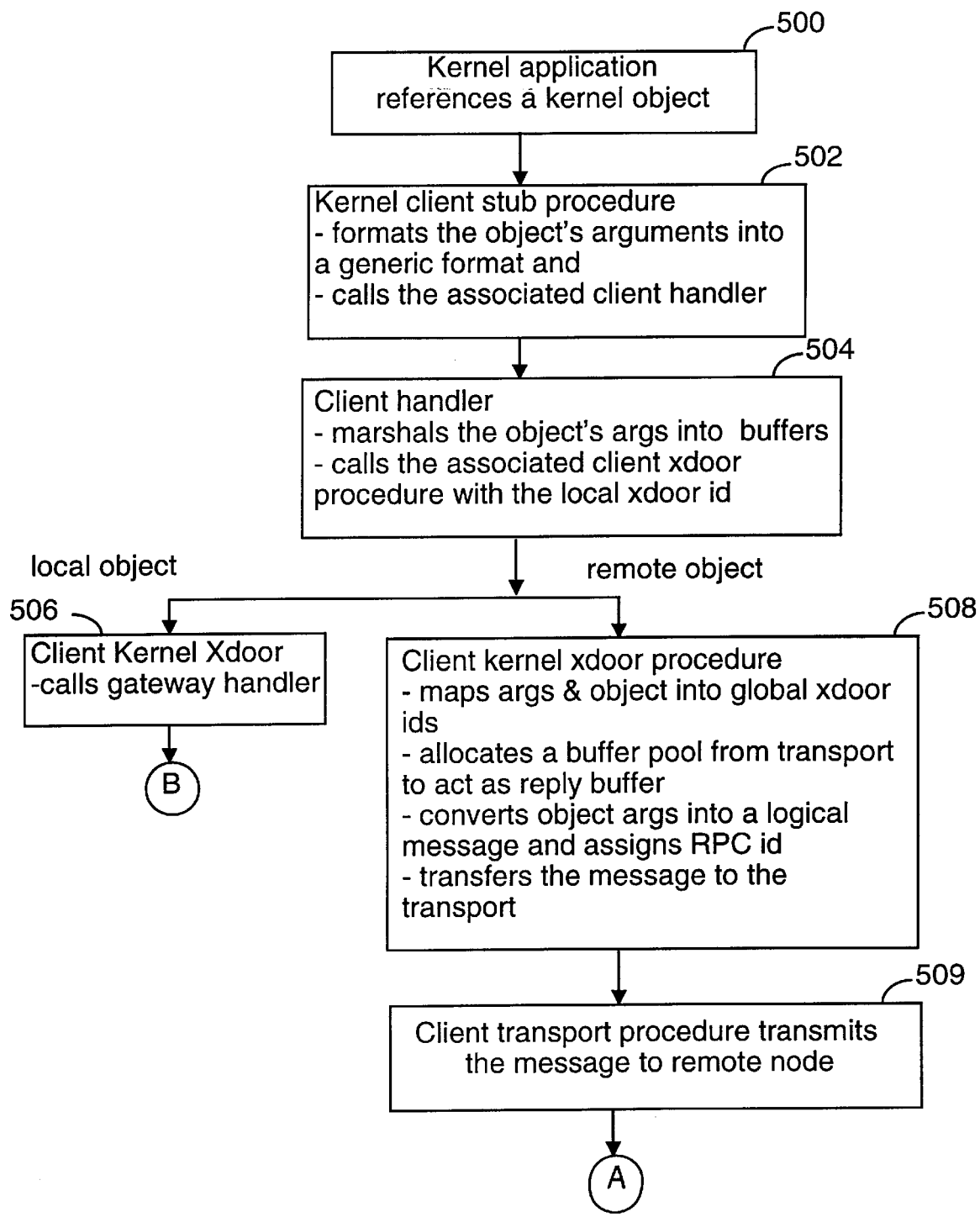
FIGS. 5A–5D are flow charts illustrating the steps used to implement a kernel-level remote object invocation.
Figure 5B:
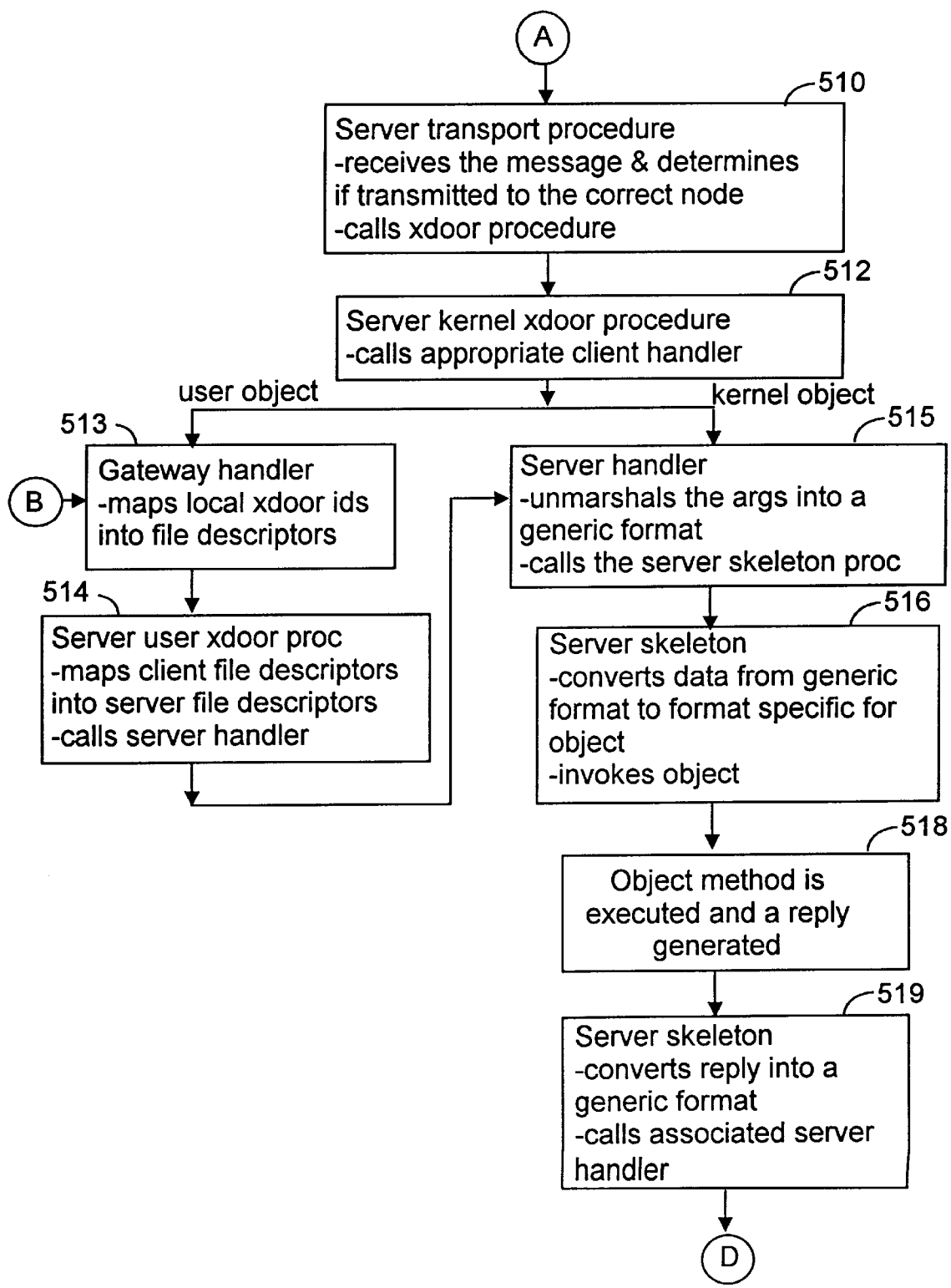
Figure 5C:
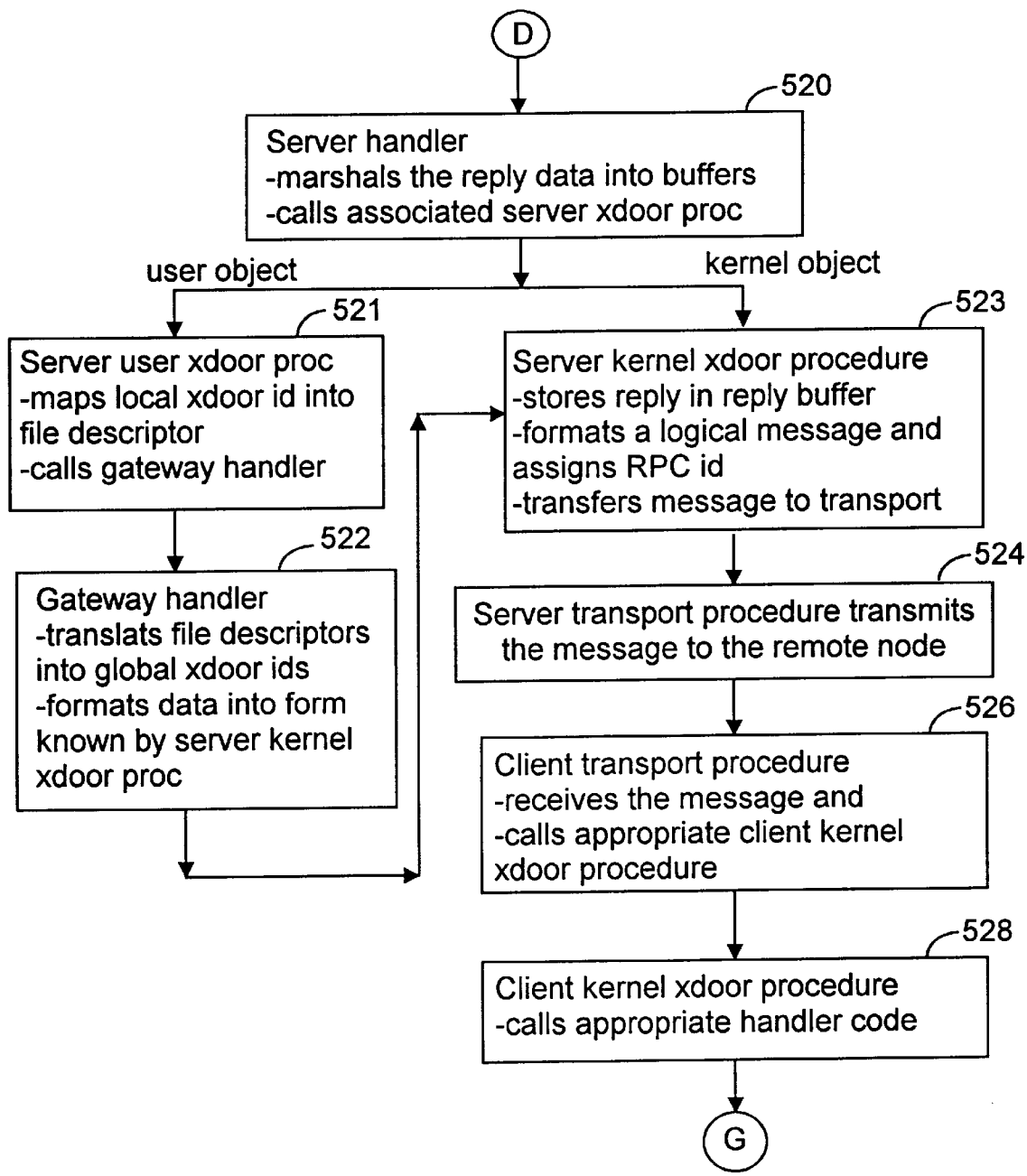
Figure 5D:
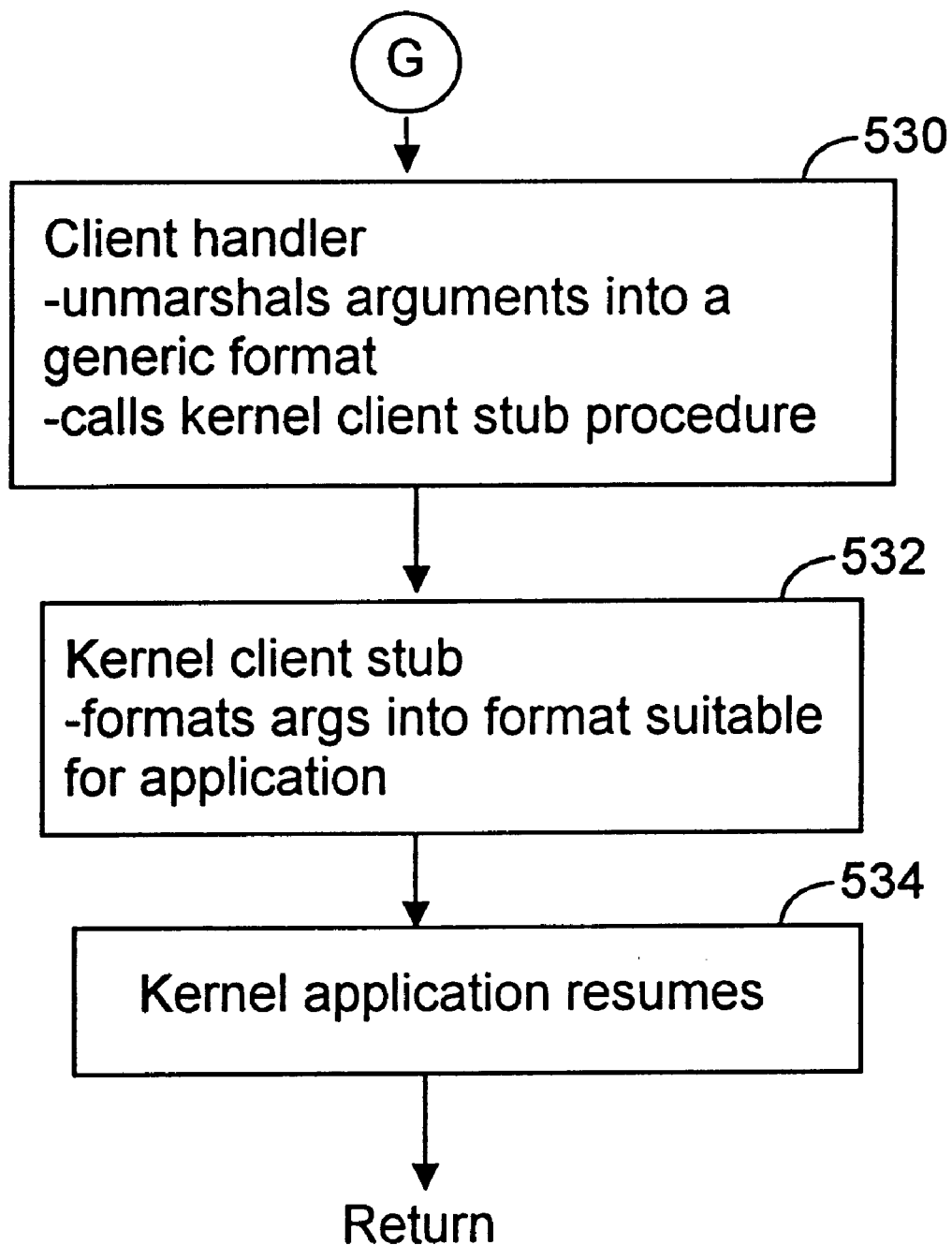

Referring to FIGS. 3A and 3B, the invocation of a kernel object within the same domain as a kernel application is treated as a local procedure call. The object invocation request is generated to execute the specified object's method and to return the results and/or exceptions to the invoking thread.

FIGS. 5A–5D illustrate the steps used to perform a remote object invocation that is initiated by a kernel application. A kernel application 204 references an object by generating a procedure call requesting the execution of a specified method of the object (step 500). The procedure call is typically accompanied by a number of arguments that can include, but are not limited to, data, procedures, or other object references. A kernel client stub procedure 208 receives the procedure call by the kernel application 204. The kernel client stub procedure 208 appears to the user as the actual method that it intends to invoke. The kernel client stub procedure 208 formats the object's arguments into a predefined format (step 502). The kernel client stub procedure 208 then transfers the object reference and its formatted arguments to a client handler procedure 169 (step 502).

A kernel-level client handler procedure 169 is associated with each kernel object 206 and used to marshal the object's arguments into one or more buffers 178 (step 504). The client handler procedure 169 also transfers control to a client xdoor procedure 174 passing to it the local xdoor identifier 147 associated with the object and the location of the buffer in the buffer pool 178 containing the object's arguments (step 504).

If the requested object is within the same node (local object), the kernel client xdoor procedure 174 uses the local xdoor identifier 147 to determine and call the appropriate gateway handler 168 associated with the requested object. The kernel client xdoor procedure 174 determines the appropriate gateway handler 168 by utilizing the server handler pointer 141 (step 506).

The gateway handler 168 maps the local xdoor identifiers of the requested object and its associated arguments into their associated file descriptors. The gateway handler 168 utilizes the requested object's file descriptor 154 to obtain the corresponding door. The process location 166 in the door indicates the entry point into the server domain for invoking the object. This is the server user xdoor procedure 128. The gateway handler 168 transfers control to the server user xdoor procedure 128 passing to it the door identifier of the requested object as well as other data (step 513). The server user xdoor procedure 128 determines and calls the appropriate server handler 122 (step 514). The server handler continues the object invocation as will be discussed below.

If the requested object is located in a remote node (remote object), the client kernel xdoor procedure 174 maps the object's arguments into their respective global xdoor identifiers, allocates a buffer 178 to act as the reply buffer, formulates a logical message including the object's arguments, the system-wide identifier as well as other information, assigns the message a RPC identifier, and transfers the message to the transport procedure 176 (step 508). The transport procedure 176 sends the message to the appropriate server node (step 509).

When the remote object invocation request arrives at the destination node, the transport procedure 176 at the destination node receives the message and extracts the system-wide identifier of the remote object. It determines whether or not the xdoor 170 corresponding to the system-wide identifier exists in the node by searching the kernel-level xdoor table 136 for a corresponding entry. If such an entry exists, the transport procedure 176 transfers the message to the server kernel xdoor procedure 174 (step 510).

The server kernel xdoor procedure 174 determines the appropriate server handler 169 to call based on the global xdoor identifier 140 associated with the remote object invocation request and transfers control to this procedure along with the passed arguments (step 512). The server handler pointer 141 in the xdoor corresponding to the global xdoor identifier 140 indicates the appropriate server handler 169 (step 512). For a user object, the server handler is a gateway handler 168.

The gateway handler 168 maps the global xdoor identifiers 140 into their respective file descriptors 154. The gateway handler 168 maps the requested object's file descriptor 154 into its associated door 162 and uses the door's process location pointer 166 to call the entry point into the server user domain (step 513). This entry point is the server user xdoor procedure 128. The server used xdoor procedure 128 then transfers control to the associated server handler 122 (step 514).

The server handler 169 unmarshals the arguments into a generic format and calls the server skeleton procedure 210 (step 515). The server skeleton procedure 210 converts the object's data from the generic format into a format suitable for the object's method which is invoked (step 516).

Once the object's method is executed, the return parameters are marshaled if no exception was produced. Otherwise, the exception itself is marshaled. At this point, the marshaled reply is ready (step 518). The server skeleton 210 converts the reply into a generic format and calls the associated server handler procedure 169 (step 519). The server handler 169 marshals the reply data into buffers 178 and calls the associated server xdoor procedure 174 passing the local xdoor identifier 147 (step 520).

Where the invoked object is a kernel object, control is passed to the server kernel xdoor procedure 174 which is described in more detail below.

Where the invoked object is associated with a user domain (user object), the server user xdoor procedure 128 maps the local xdoor identifiers into their respective file descriptors 154. The server user xdoor procedure 128 then calls the associated gateway handler 168 (step 521). The gateway handler 168 translates the file descriptors 154 into their respective global xdoor identifiers 140 as well as format the passed data into a form known by the server kernel xdoor procedure 174 (step 522). Processing control is then passed to the server kernel xdoor procedure 174.

The server kernel xdoor procedure 174 stores the reply in a reply buffer 178, formats the reply into a logical message and assigns a RPC identifier, and transfers the logical message to the server transport procedure 176 (step 523).

The server transport procedure 176 transmits the message to the remote node (step 524). The client transport procedure 176 receives the message and calls the appropriate client kernel xdoor procedure 174 (step 526). The client kernel xdoor procedure 174 translates the global xdoor identifiers in the received message to their corresponding local xdoor identifiers 147 and then passes the reply message to the appropriate client handler 169 (step 528). The client handler 169 unmarshals the arguments in the reply message into a generic format and calls the kernel client stub procedure 208 (step 530). The kernel client stub procedure 208 formats the arguments into a suitable format for the kernel application 204 (step 532) and the kernel application resumes (step 534).

The foregoing description focused on the manner in which object invocations are performed utilizing the interprocess communications facility and ORB of the underlying computing environment. An advantage of the remote object invocation technology of the present invention is that the same modules and steps can be used in both the client and server side of a remote object invocation. This minimizes the need for additional interfaces to accommodate different processing modules in each side of a remote object invocation.

Attention now turns to the manner in which this infrastructure is generated in order to support object invocations as described above.

Exportation of Object References

An application can only access an object that it has been granted access to. An application having access to an object exports a reference to that object to other applications. This can occur when the object is passed as an argument in a remote object invocation. When an object reference is exported, the ORB generates the appropriate mechanisms that will support a subsequent remote object invocation for the object by the domain receiving the reference.

The first time that an user object reference is passed to another domain, the client user xdoor procedure 128 generates a door 162 and a file descriptor 154 for the object reference. The door 162 is stored in the door table 132. The door's process location 166 is set to the appropriate server-side user xdoor procedure 128.

The first time that an user object reference is passed to a remote node, the server-side ORB generates an xdoor 170 for the object reference as well as a gateway handler 168. The xdoor 170 contains a global xdoor identifier 140, a node identifier 142, a pointer 144 to the gateway handler 168, and a door identifier 146.

When a node receives an object reference that is not in its kernel xdoor table 136, the client kernel xdoor procedure 174 generates an xdoor 170 for the object reference and a handler 168. For an user object, the handler is a gateway handler and for a kernel object, the handler is a client kernel handler. The xdoor 170 includes the global xdoor identifier 140 and the node identifier 142 that is received in the remote object invocation. The gateway handler 168 associated with the requested object is used to generate a door 162 for the object reference and a file descriptor 154. The process location of the door 162 points to the associated gateway handler 168. Applications in the node utilize the file descriptor 154 as its handle for invocations on this object.

By exporting object references in this manner, there is control over the applications that can access an object. This provides a secure environment in which the threat of disastrous results due to unauthorized access is minimized.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIG. 1. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

In addition, the present invention has been described with reference to a file descriptor as the mechanism used to invoke an object. The present invention is not limited to the use of a file descriptor. Other types of protected entities can be employed to protect an object handle from unwanted access by a user or kernel application.

What is claimed is:

1. A client/server computer apparatus, comprising:

a communications link;

one or more client computers coupled to said communications link;

one or more server computers coupled to said communications link, each of said one or more server computers comprising:

a plurality of user-level objects, each user-level object having a respective user-level object reference for invoking said object, and a distinct respective server-side kernel-level protected entity used to invoke said object, each server-side kernel-level protected entity including a data structure that is distinct and separate from the respective object which it is used to invoke and that is also distinct and separate from the user-level object reference for the respective object;

an object resource broker (ORB), resident on both said server computers and said client computers;

wherein each client computer comprises:

a plurality of client-side kernel-level protected entities, each client-side kernel-level protected entity used to invoke an object resident in one of said server computers;

said ORB includes:

kernel-level transport procedures for securely transporting remote object invocations and replies between said server and client computers;

an object exportation mechanism having a capability to export the user-level object reference to a specified object of said plurality of user-level objects to select ones of said client computers;

a remote object reference mechanism having a capability to generate a client-side kernel-level protected entity for each user-level object reference that is exported to any one of said client computers;

kernel-level tables for storing said server-side and client-side kernel-level protected entities; and kernel-level procedures for mapping user-level remote object invocations using the user-level object references into kernel-level remote object invocations using the client-side kernel-level protected entities and for mapping received kernel-level remote object invocations directed to user-level objects into user-level object invocations using the user-level object references to the user-level objects to which the invocations are directed;

the kernel-level procedures including instructions for blocking any remote object invocation by any one of said client computers to an object for which the one client computer does not have the corresponding client-side protected entity.

2. The apparatus of claim 1,
wherein each kernel-level protected entity represents a kernel-level file descriptor.

3. The apparatus of claim 1, wherein said object exportation mechanism comprises:
an xdoor mechanism having a capability to generate a global identifier corresponding to each exported user-level object reference; and
an object specific gateway handler having a capability to map a server-side kernel-level protected entity associated with an exported user-level object reference into a corresponding global identifier.

4. The apparatus of claim 1, wherein
said remote object reference mechanism comprises an xdoor mechanism having a capability to generate an object-specific gateway handler associated with a received exported user-level object reference; and
said gateway handler has a capability to generate a client-side kernel-level protected entity for said received exported user-level object reference.

5. The apparatus of claim 4, wherein
said client computers each includes an object invocation request mechanism having a capability to invoke an object resident in one of said server computers; and
the object invocation request mechanism utilizes said gateway handler to map a client-side kernel-level protected entity representing a requested object into a corresponding global identifier and utilizes said xdoor mechanism to formulate an object invocation request including the global identifier.

6. The apparatus of claim 3, wherein:
said server computers each includes an object invocation mechanism having a capability to service a received object invocation request; and
said object invocation mechanism utilizes said xdoor mechanism to transfer said received object invocation request to the object-specific gateway handler associated with a requested object and utilizes said gateway handler to map a received global identifier into a corresponding server-side kernel-level protected entity that is used to invoke the requested object.

7. The apparatus of claim 6, wherein:
said server computer includes a server-side reply mechanism having a capability to formulate a reply in response to an object invocation request; and
said server-side reply mechanism utilizes said gateway handler to map server-side kernel-level protected entities included in said reply into corresponding global xdoor identifiers and utilizes said xdoor mechanism to format said reply for transmission to an associated client computer.

8. The apparatus of claim 5, wherein:
said client computer includes a client-side reply mechanism having a capability to handle a received reply in response to an object invocation request; and
said client-side reply mechanism utilizes said xdoor mechanism to determine a gateway handler associated with the received reply and utilizes said gateway handler to map global identifiers in the received reply to corresponding client-side kernel-level protected entities in order to process the received reply.

9. A computer-implemented method for performing a remote object invocation for use in a computing system including a plurality of client and server nodes, the method comprising the steps of:
providing in each server node a plurality of user-level objects, each user-level object having associated therewith a respective user-level object reference for invoking the object and a distinct, respective server-side kernel-level protected entity used to invoke the object, each server-side kernel-level protected entity including a data structure that is distinct and separate from the respective object which it is used to invoke and that is also distinct and separate from the user-level object reference for the respective object;
exporting a user-level object reference to an object to one or more of said client nodes;
associating in each client node that receives an exported user-level object reference a client-side kernel-level protected entity that is used to invoke the exported object resident in the server node, the client-side kernel-level protected entity including a global identifier that is associated with and uniquely identifies the exported object within said system;
using kernel-level procedures, generating in a client node a remote object invocation request to invoke a requested object having an associated client-side kernel-level protected entity, said remote object invocation request including a global identifier corresponding to said requested object;
using kernel-level procedures, transmitting said remote object invocation request to an intended server node;
using kernel-level procedures, receiving in the intended server node the remote object invocation request to invoke said requested object;
using kernel-level procedures, mapping said global identifier in the remote object invocation request into a corresponding server-side kernel-level protected entity; and
utilizing the server-side kernel-level protected entity to invoke said requested object.

10. The method of claim 9, further comprising the steps of:
formulating in the intended server node a reply to said remote object invocation request, said reply including the server-side kernel-level protected entity identifying the invoked requested object;
mapping the server-side kernel-level protected entity into the corresponding global identifier using an object-specific gateway handler; and
transmitting the reply including the invoked requested object's global identifier to said client node that transmitted said remote object invocation request.

11. The method of claim 10, further comprising the steps of:
receiving in said client node the reply;
translating the global identifier included in the reply into the associated client-side kernel-level protected entity; and
utilizing the client-side kernel-level protected entity to process the reply.

12. The method of claim 9, wherein the server-side kernel-level protected entity and the client-side kernel-level protected entity comprise file descriptors.

13. A computer program product for use in conjunction with a computer in a computer having a plurality of computers, the computer program product comprising a computer storage medium and a computer program mechanism embedded therein, the computer program mechanism comprising:

a plurality of user-level objects, each user-level object having associated therewith a respective user-level object reference for invoking the object and distinct, respective server-side kernel-level protected entity used to invoke said user-level object, each server-side kernel-level protected entity including a data structure that is distinct and separate from the respective object which it is used to invoke and that is also distinct and separate from the user-level object reference for the respective object; and an object resource broker (ORB), including:

kernel-level transport procedures for securely transporting remote object invocations and replies between said computer and other ones of the plurality of computers;

an object exportation mechanism having a capability to export the user-level object reference to a specified object of said plurality of user-level objects to select ones of said other computers;

a remote object reference mechanism having a capability to generate a client-side kernel-level protected entity for each user-level object reference that is exported to any one of said other computers;

kernel-level tables for storing said server-side and client-side kernel-level protected entities; and kernel-level procedures for mapping locally generated user-level remote object invocations using the user-level object references into kernel-level remote object invocations using the client-side kernel-level protected entities and for mapping received kernel-level remote object invocations directed to user-level objects in said computer into user-level object invocations using the user-level object references to the user-level objects to which the invocations are directed;

the kernel-level procedures including instructions for blocking any remote object invocation by any one of said computers to an object for which the one client computer does not have the corresponding client-side protected entity.

14. The mechanism of claim 13, wherein said object exportation mechanism has a capability to associate with each exported user-level object reference a global identifier uniquely identifying an exported object;

said remote object invocations each includes a global identifier of a requested object; and said kernel-level procedures include an object-specific gateway handler for mapping a global identifier associated with a requested object into a corresponding first kernel-level protected entity for use in invoking said requested object.

15. The mechanism of claim 13, wherein the server-side and client-side protected entities are represented as file descriptors.

* * * * *